United States Patent [19]

Hosogoe

[11] Patent Number: 4,559,532
[45] Date of Patent: Dec. 17, 1985

[54] X-Y POSITION INPUT DEVICE FOR DISPLAY SYSTEM

[75] Inventor: Junichi Hosogoe, Miyagi, Japan

[73] Assignee: Alps Electric Co., Ltd., Japan

[21] Appl. No.: 521,324

[22] Filed: Aug. 8, 1983

[30] Foreign Application Priority Data

Aug. 7, 1982 [JP] Japan ............................ 57-119452[U]
Aug. 7, 1982 [JP] Japan ............................ 57-119457[U]
Aug. 7, 1982 [JP] Japan ............................ 57-119460[U]

[51] Int. Cl.$^4$ .............................................. G09G 1/00
[52] U.S. Cl. ................................. 340/710; 74/471 XY
[58] Field of Search ................... 340/710; 74/471 XY, 74/198

[56] References Cited

U.S. PATENT DOCUMENTS 3,835,464 9/1974 Rider .................................... 340/710
4,404,865 9/1983 Kim ..................................... 340/710

Primary Examiner—Marshall M. Curtis
Attorney, Agent, or Firm—Guy W. Shoup; Gerard F. Dunne

[57] ABSTRACT

An X-Y input device comprises a rotatable ball, a first driven roller held in contact with the rotatable ball and rotatable in response to rotation of the rotatable ball, a second driven roller held in contact with the rotatable ball and rotatable in response to rotation of the rotatable ball, the second driven roller having an axis of rotation extending perpendicularly to that of the first driven roller, first angle detector means for detecting an angle of rotation of the first driven roller, second angle detector means for detecting an angle of rotation of the second driven roller, and a casing housing the rotatable ball, the first and second driven rollers, and the first and second angle detector means. The casing has a lower opening with the rotatable ball partly projecting downwardly therethrough for rolling movement on a base. The casing has at least one annular projection on a lower surface thereof for rejecting foreign matter.

5 Claims, 35 Drawing Figures

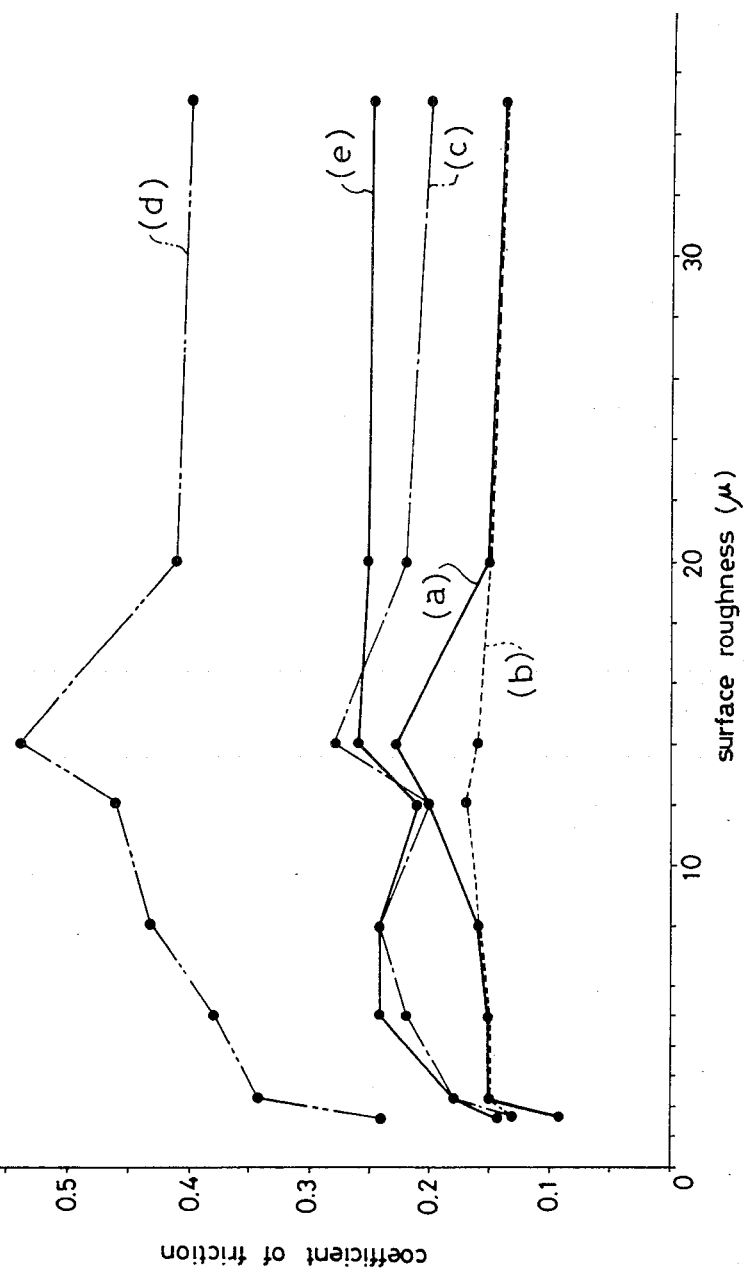

X-Y POSITION INPUT DEVICE FOR DISPLAY SYSTEM

BACKGROUND OF THE INVENTION

The present invention relates to an X-Y input device, and more particularly to an X-Y input device suitable for use as a graphics input device associated with a graphic display apparatus.

Graphic display apparatus are basically composed of a display screen, a display controller, a data channel, and an input device which may be in various forms. One known input device is a "joystick" having a lever supported by a gimbal mechanism and tiltable by the operator in any direction of a plane. A control device detects the direction and angle of tilt of the lever and generates voltages or digital signals indicative of coordinate values in X and Y directions. This type of input device is disadvantageous however in that the range of angular movement of the lever is limited and data signals entered by the operator are relatively unstable.

In an effort to eliminate the above shortcomings, there has been developed an input device called a "mouse". One type of the mouse has a rotatable member such as a steel ball (hereinafter referred to as a "ball"), a first driven roller held in contact with the ball and rotatable in response to rotation thereof, and a second driven roller held in contact with the ball and rotatable in response to rotation thereof. The first and second rollers have their axes of rotation extending substantially perpendicularly to each other. The mouse also includes first and second angle detector means composed of variable resistors or encoders for separately detecting angles of rotation of the first and second driven rollers. The ball, first and second driven rollers, and first and second angle detector means are all housed in a casing.

The casing has an opening defined in its bottom with the ball partly projecting through the opening. In use, the casing is held by the operator to place the ball against a given surface. By moving the case to cause the ball to roll on the surface in any desired two-dimensional directions, the first and second driven rollers are rotated about their own axes in directions and through angles dependent on the rolling movement of the ball. The directions and angles of rotation of the driven rollers are converted by the first and second angle detector means into voltages or digital signals representative of coordinate values in X and Y directions. The generated signals are then entered into a display apparatus.

SUMMARY OF THE INVENTION

It is an object of the present invention to provide an X-Y input device of the type known as a mouse, which is highly reliable in construction and operation.

According to the present invention, there is provided an X-Y input device comprising a rotatable ball, a first driven roller held in contact with the rotatable ball and rotatable in response to rotation of the rotatable ball, a second driven roller held in contact with the rotatable ball and rotatable in response to rotation of the rotatable ball, the second driven roller having an axis of rotation extending perpendicularly to that of the first driven roller, first angle detector means for detecting an angle of rotation of the first driven roller, second angle detector means for detecting an angle of rotation of the second driven roller, and a casing housing the rotatable ball, the first and second driven rollers, and the first and second angle detector means, the casing having a lower opening with the rotatable ball partly projecting downwardly therethrough for rolling movement on a base, the casing having at least one rejector projection such as an annular ridge and a projection on a lower surface thereof for rejecting foreign matter.

The rejector projection on the lower surface of the casing can push aside any foreign matter such as pieces of paper, cut threads or other small pieces during operation of the X-Y input device, thus making the rotatable ball free from the possibility of rolling over such foreign matter. If the ball rolled on a foreign object, the ball would rotate irregularly, unstable signals would be generated, and the X-Y input device would not be operated smoothly and properly. The X-Y input device of the invention is free from such difficulties, capable of producing stable signals and being operated smoothly.

The annular rejector projection surrounding the opening in the casing can exclude foreign objects even when the input device is moved in any direction. The plurality of annular rejector projections surrounding the operning in the casing can reject foreign matter more reliably.

The rejector projection integral with the casing around the peripheral edge of the opening on the lower surface of the casing serves to reinforce the peripheral edge of the opening adjacent to which the rotatable ball of a large weight is disposed.

The casing may be supported by three balancer projections extending downwardly slightly beyond the rejector projection. The casing may thus be kept in balance during use of the input device, and the areas of contact with the base can be substantially reduced. The three balancer projections are located radially outwardly of the rejector projection and project downwardly beyond the latter. This also substantially reduces the areas of contact with the base, keep the input device in balance during use, and can improve the ease with which the input device is operated.

Additionally, the rotatably ball may serve as one of the supports of the base in one embodiment of the present invention, and the input device can be operated highly smoothly for increased ease with which the iinput device is used.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 16 is a graph showing the relationship between the surface roughness and the coefficient of friction of the ball;

DESCRIPTION OF THE PREFERRED EMBODIMENTS

Figure 1:
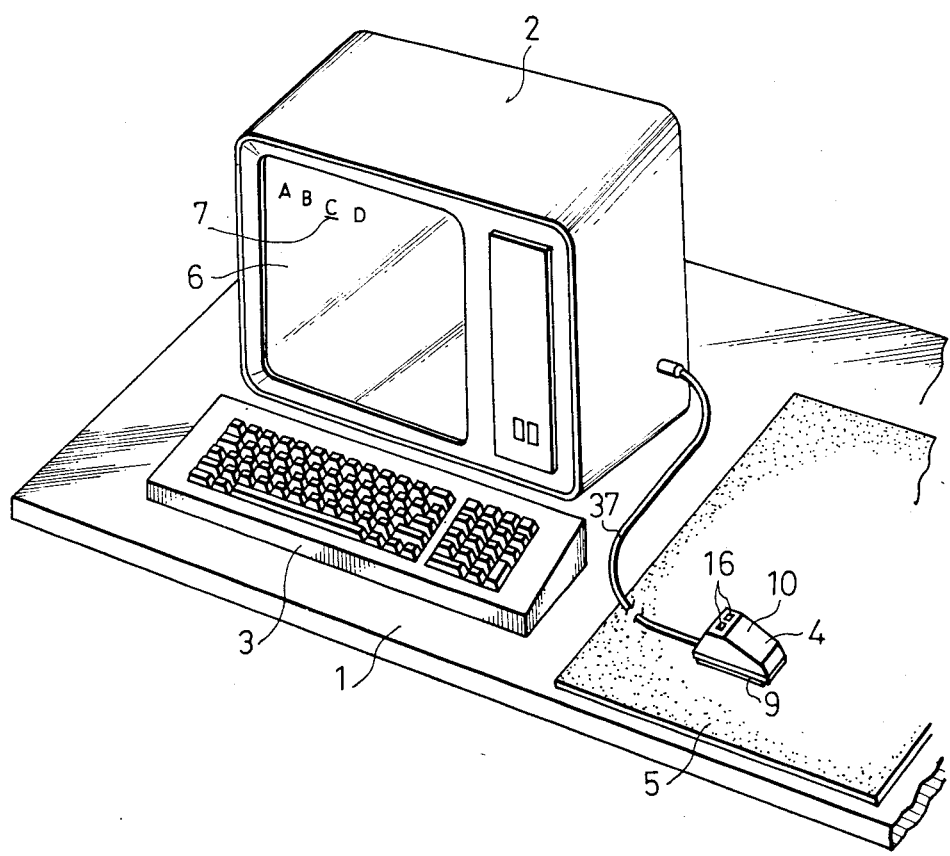
FIG. 1 is a perspective view of a graphic display apparatus including an X-Y input device according to the present invention.

FIG. 1 shows in perspective a graphic display apparatus incorporating therein an X-Y input device according to the present invention.

The graphic display apparatus illustrated in FIG. 1 comprises a display unit 2 mounted on a table 1 and having a screen, a controller, and a data channel, an input device 3 having function keys, and an X-Y input device 4 according to the present invention. The X-Y input device 4 is operated by the operator on a sheet 5 placed on the table 1 to move a cursor 7 to any desired position on a screen 6 of the display unit 2.

The construction and principles of operation of the x-Y input device 4 will be described with reference to FIGS. 2 through 5.

Figure 3:
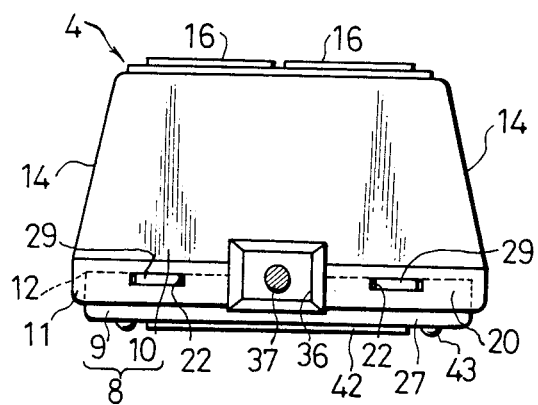
FIG. 3 is a front elevational view of the X-Y input device.
Figure 4:
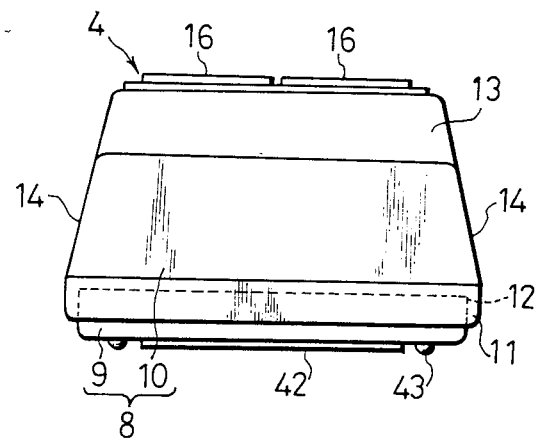
FIG. 4 is a rear elevational view of the X-Y input device.

The X-Y input device 4 has a casing 8 composed of a lower case 9 and an upper case 10, the lower and upper cases 9, 10 being molded of hard synthetic resin. As shown in FIGS. 3 and 4, the upper case 10 has a lower end 11 fitted over an upper end 12 of the lower case 9 to prevent dust, water and other foreign matter from entering into the casing 8 through the joint between the lower case 9 and the upper case 10.

Figure 2:
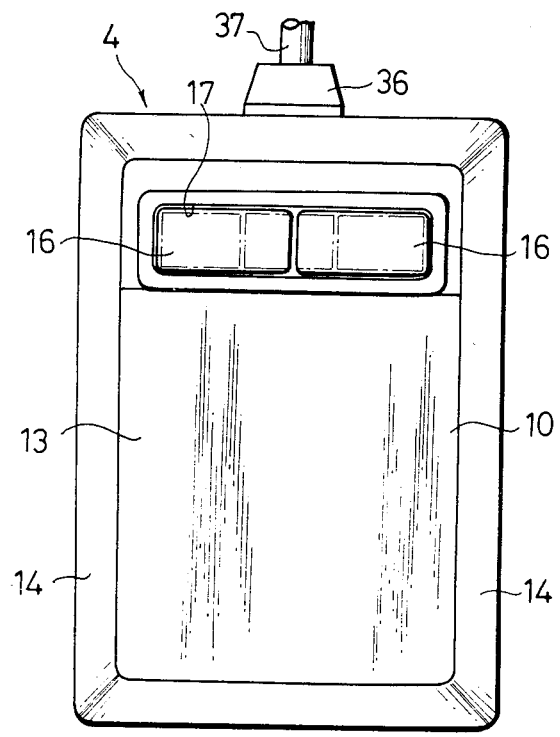
FIG. 2 is a plan view of the X-Y input device.
Figure 5:
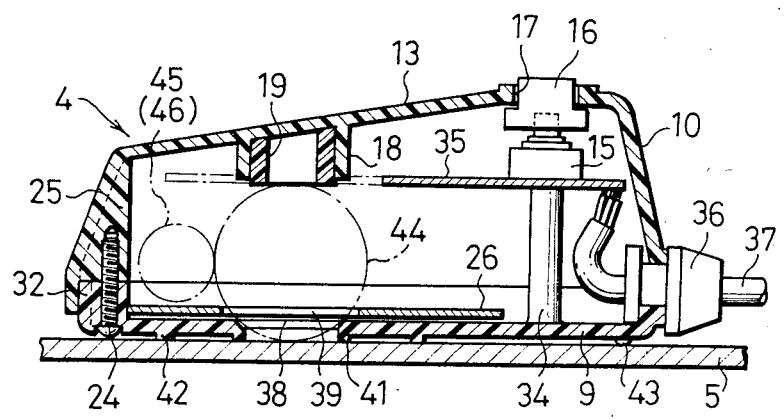
FIG. 5 is a cross-sectional veiw of the X-Y input device.

The upper case 10 is of a size which can be held by one hand of the operator. As illustrated in FIGS. 2 through 5, the upper case 10 includes a slanted upper wall 13 and a pair of slanted side walls 14, 14 that allow the operator to hold the upper case 10 with ease. The upper wall 13 has an elongate slot 17 defined therethrough at a position corresponding to a finger of the operator's hand gripping the upper case 10, there being switches 15 having switch actuators 16 fitted in the elongate slot 17. The switches 15 comprise pushbutton switches provided in two or three (shown by the dot-and-dash lines) as illustrated in FIG. 2. The switches 15 serve to delete a portion of an displayed pattern immediately above the cursor 7, move such a displayed pattern portion to another location, or effect other control. As shown in FIGS. 3 through 5, the switch actuators 16 have upper end projecting slightly upwardly through the upper case 10.

Figure 6:
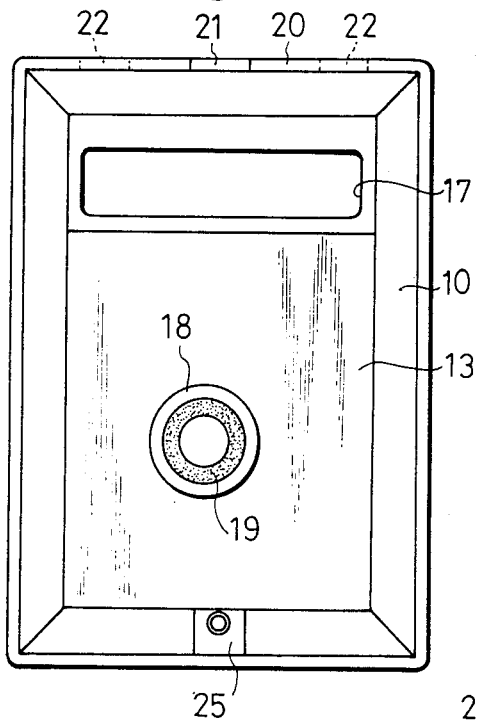
FIG. 6 is a bottom view of an upper case of the X-Y input device.

FIG. 6 is a bottom view of the upper case 10. The upper wall 13 has an integral sleeve 18 projecting downwardly from an inner surface of the upper wall 13. A short cylindrical resilient damper 19 made of synthetic rubber, for example, is inserted in the sleeve 18. The damper 19 may either be forcibly pushed resiliently into the sleeve 19 or be bonded to the sleeve 18 with an adhesive. At any rate, the damper 29 is fixed to the sleeve 18. As shown in FIG. 5, the damper 19 has a lower end slightly projecting downwardly beyond the lower end of the sleeve 18 so as to normally be out of contact with the surface of ball 44, as shown in FIG. 5. The damper 19, however, serves to absorb shocks that may be applied to the ball, such as when the X-Y device 4 is dropped inadvertently.

As shown in FIG. 6, the upper case 10 includes a front wall 20 having a substantially central recess 21 for allowing a bushing to be fitted therein, and a pair of connector holes 22, 22 disposed one on each side of the central recess 21. The upper case 10 also includes a rear wall 23 having an integral screw insertion area 25 in which a self-tapping screw 24 (FIG. 5) can be threaded.

Figure 7:
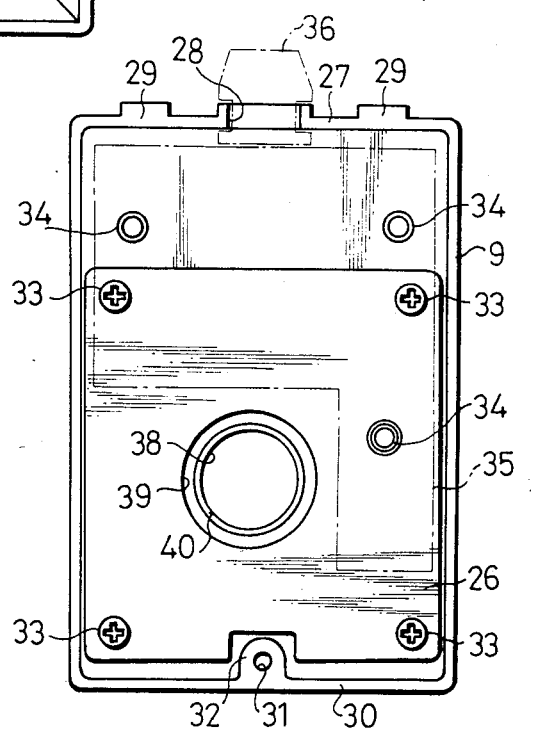
FIG. 7 is a plan view of the upper case with an attachment plate attached thereto.
Figure 8:
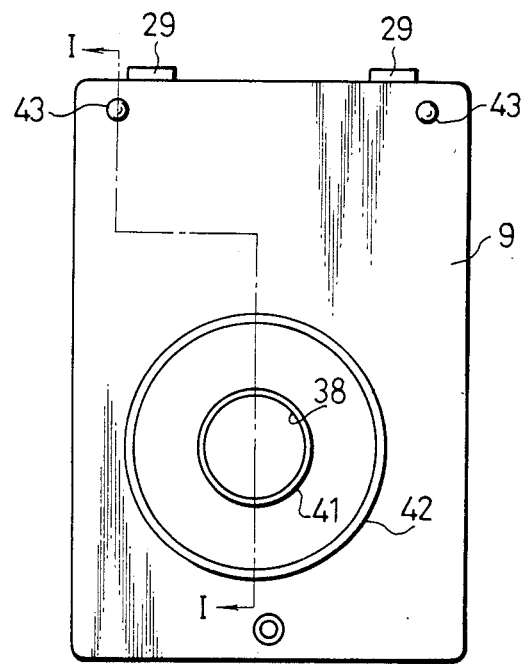
FIG. 8 is a bottom view of a lower case of the X-Y input device.

FIG. 7 is a plan view of the lower case 9 with an attachment plate 26 mounted thereon, and FIG. 8 is a bottom view of the lower case 9. The lower case 9 includes a front wall 27 having a substantially central recess 28 for insertion therein a bushing, and a pair of connector ledges 29, 29 disposed one on each side of the central recess 28. The lower case 9 also includes a rear wall 30 having an integral screw insertion area 32 projecting from a central inner surface of the rear wall 30, the screw insertion area 32 having an insertion hole 31. As shown in FIG. 7, the attachment plate 26, which is made of metal or hard synthetic resin, is fastened by screws 33 to the lower case 9 with a slight clearance left thereabove. The attachment plate 26 serves to attach various components thereto, as described later, and also as a reinforcement for the lower case 9. A plurality of posts 34 (three in the illustrated embodiment) projecte integrally from the lower case 9, and a printed-circuit board 35 having a prescribed conductive pattern (not shown) is fixed by screws to upper ends of the posts 34. In the illustrated embodiment, one of the posts 34 projects upwardly through the attachment plate 26 as illustrated in FIG. 7.

As shown in FIG. 3, the lower case 9 and the upper case 10 are interconnected by the connector ledges 29, 29 of the lower case 9 which are fitted respectively in the connector holes 22, 22 in the upper case 10 and by the self-tapping screw 24 threaded through the lower case 9 into the screw insertion area 25 of the upper case 10. When the lower case 9 and the upper case 10 are to be joined, a bushing 36 made of rubber is fitted into the recesses 21, 28 and clamped between the lower case 9 and the upper case 10. The bushing 36 serves to protect a signal cable 37 having one end connected to the printed-circuit board 35 as shown in FIG. 5 and an opposite end connected to an input terminal of the display unit 2 (FIG. 1). The signal cable 27 has a length such that it will allow the X-Y input device 4 to be moved freely around on the sheet 5.

Figure 9:
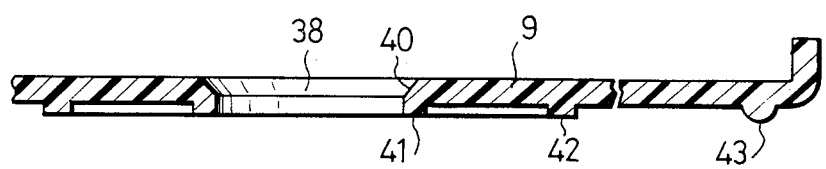
FIG. 9 is an enlarged cross-sectional view taken along line I—I of FIG. 8.

As illustrated in FIG. 7, the lower case 9 has a circular opening 38 defined therein, and the attachment plate 26 has a through hole 39 aligned with the circular opening 38 and having a diameter slightly greater than that of the circular opening 38. FIGS. 8 and 9 illustrate one embodiment of the present invention. As shown in FIG. 9, which is a cross-sectional view taken along line I—I of FIG. 8, a peripheral edge of the opening 38 has a downwardly tapered surface 40 having a slightly smaller diameter at its lower end. The peripheral edge of the opening 38 includes an annular ridge 41 projecting downwardly in surrounding relationship to the opening 38. The lower case 9 also has a projection 42 spaced radially outwardly from the annular ridge 41. The annular ridge 41 and the projection 42 are formed integrally with the lower case 9 and have substantially the same height. This annular ridge 41 and projection portion 42 each serve as a rejector projection to push aside any foreign matter such as pieces of paper, cut threads or other small items during operation of the X-Y devices. In this way, the ball 44 will not likely roll over such objects to degrade the signals from the device.

As shown in FIG. 8, the annular ridge 41 and the projection 42 are displaced to the rear end of the lower case 9. The lower case 9 also has a pair of balancer projections 43 positioned closely to the front end of the lower case 9 at opposite side thereof. In the illustrated embodiment, the X-Y input device 4 is kept bodily stable in balance without unwanted wobbling movement by being supported by the annular ridge 41, projection 42 and the side projections 43, 43.

Figure 10:
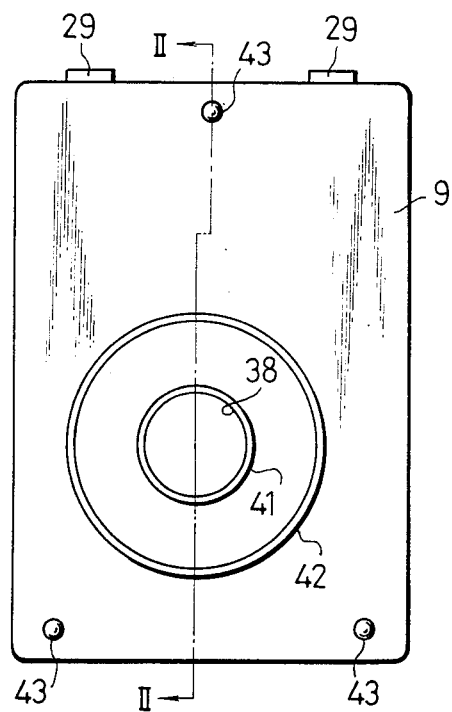
FIG. 10 is a bottom view of a lower case according to another embodiment.
Figure 11:
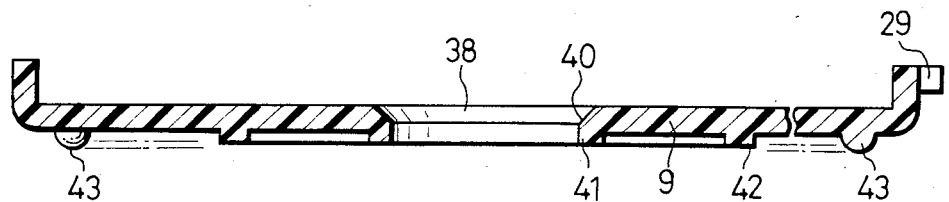
FIG. 11 is an enlarged cross-sectional view taken along line II—II of FIG. 10.

FIG. 10 is a bottom view of a lower case 9 according to another embodiment, and FIG. 11 is an enlarged cross-sectional view taken along line II—II of FIG. 10. According to this emodiment, the lower case 9 has on its lower surface a balancer projection 43 positioned substantially centrally at a front end thereof, and a pair of balancer projections 43, 43 positioned at a rear end in laterally spaced relation. These three balancer projections 43 serve to support the X-Y input device 4 stably in balance during use. The balancer projections 43 may be arranged such that two balancer projections 43 are located on the front end of the lower case 9 in laterally spaced relation while a single balancer projection 43 is located substantially centrally on the rear end.

As shown in FIG. 11, the balancer projections 43 have a length larger than that of the annular ridge 41 and the projection 42. This allows the annular ridge 41 and the projection 42 to be kept out of contact with or in light contact with the sheet when the X-Y input device 4 is operated on the sheet.

Figure 12:
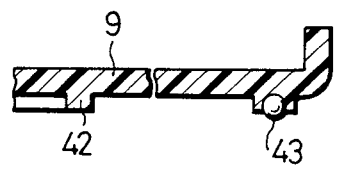
FIG. 12 is an enlarged cross-sectional view showing a modified balancer projection.

The balancer projections 43 have rounded lower ends to provide as small a resistance as possible to movement thereof on the sheet. There are two methods of providing such rounded lower ends. According to one method, the balancer projections 43 having the rounded lower ends are integrally formed with the lower case 9 as shown in FIGS. 9 and 11. According to the second method shown in FIG. 12, a small-diameter steel ball is partly embedded in the lower case 9 so that a lower end of the steel ball slightly projects downwardly. The steel ball protects the balancer projection 43 against wear and allows the same to function as desired for a prolonged period time.

A ball 44 made of steel and having a prescribed weight is disposed substantially above the opening 38 in the lower case 9 and has a portion projecting downwardly through the opening 38 for rolling movement on a base which may be the sheet 5 or other surface. The ball 44 is essentially free floating within the opening 38 and may freely move upwards through a small range enabling the ball to travel over surface irregularities in the sheet 5 or other surface.

Figure 13:
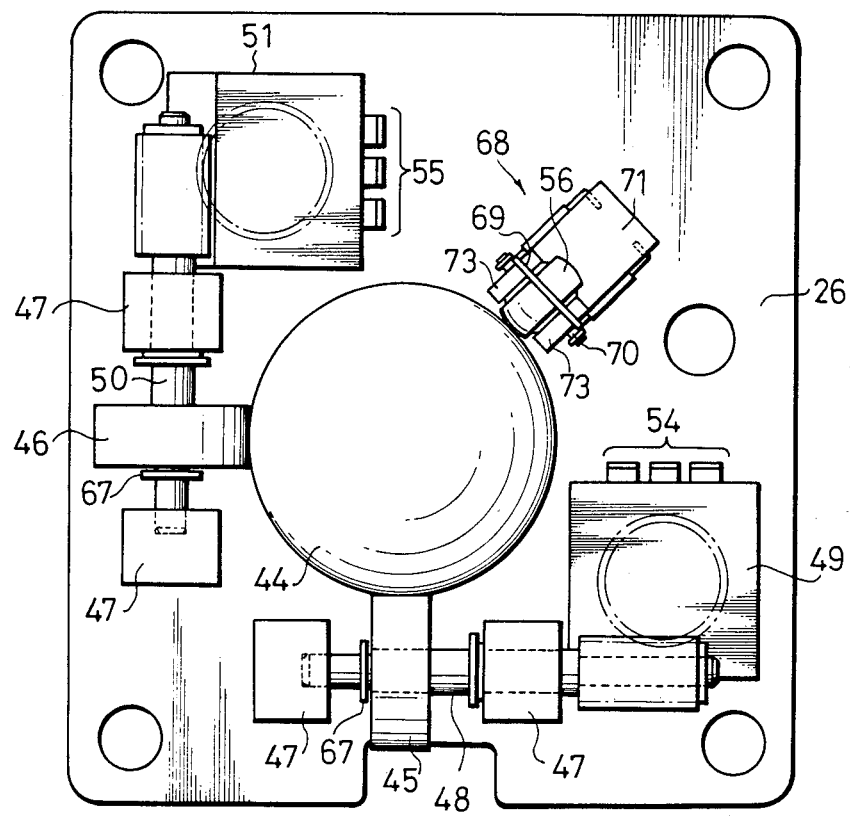
FIG. 13 is an enlarged plan view of an operating unit in the X-Y input device.

FIG. 13 shows in enlarged plan view an operating unit in the X-Y input device which is illustrated in the process of being assembled. A first driven roller 45 and a second driven roller 46 are kept in contact with the spherical surface of the ball 44. The first and second driven rollers 45, 46 are rotatably mounted by bearings 47 on the attachment plate 26. Although not shown, the bearings 37 are screwed to the attachment plate 26. The first and second driven rollers 45, 46 are molded of polyacetal with glass fibers mixed therein at a prescribed proportion. The bearing 47 are molded of synthetic resin having a small coefficient of friction, such as fluorocarbon resin or polyacetal.

Figure 14:
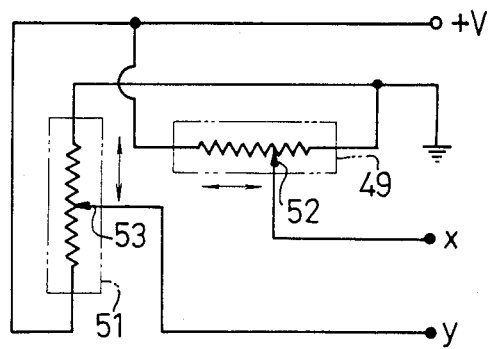
FIG. 14 is a circuit diagram of the operating unit.

As illustrated in FIG. 13 in which the operating unit is seen in plan view, the first and second driven rollers 45, 46 have their axes extending perpendicularly to each other and are separately rotated in response to rotation of the ball 44. The direction and angle of rotation of the first driven roller 45 is detected by a first variable resistor 49 coupled thereto by means of a rotatable shaft 48. Likewise, the direction and angle of rotation of the second driven roller 46 is detected by a second variable resistor 51 coupled thereto by means of a rotatable shaft 50. As shown in FIG. 14, any change in the direction and angle of rotation of the first driven roller 45 is detected as a variation in the direction and distance of movement of a slider 52 of the first variable resistor 49. Similarly, any change in the direction and angle of rotation of the second driven roller 46 is detected as a variation in the direction and distance of movement of a slider 53 of the second variable resistor 51. Therefore, any rotation of the ball 44 can be divided into movements in X and Y directions, and such orthogonal components can be detected as voltages across the first and second variable resistors 49, 51. The variable resistors 49, 51 are required to be responsive to a small torge applied to the rollers 45, 46.

The first and second variable resistors 49, 51 have terminal groups 54, 55, respectively, extending upwardly and connected to the printed-circuit board 35.

Figure 15:
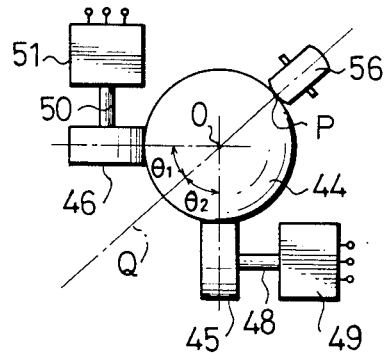
FIG. 15 is a plan view illustrative of an arrangement of a ball, driven rollers, and a biasing roller.

The ball 44, the driven rollers 45, 46, and a resiliently biasing roller 56 are arranged as shown in FIG. 15. The resiliently biasing roller 56 is held in contact with the ball 44 and positioned in confronting relation to the driven rollers 45, 46 across the ball 44, as shown in FIGS. 13 and 15. The resiliently biasing roller 56 serves to assure reliable transmission of rotation from the ball 44 to the first and second driven rollers 45, 46. The resiliently biasing roller 56 is freely rotatably in response to rotation of the ball 44 and resiliently urges the ball 44 against the first and second driven rollers 45, 46.

As illustrated in FIG. 15, the resiliently biasing roller 46 contacts the ball 44 at a point P and the ball 44 has a center O of rotation. A straight line Q passing through the point P and the center O extends centrally between the first and second driven rollers 45, 46. Stated otherwise, the first and second driven rollers 45, 46 are rotatable in planes which form equal angles $\theta_1$, $\theta_2$ with the central line Q. The resiliently biasing roller 56 thus positioned allows the ball 44 to contact the first and second driven rollers 45, 46 under equalized pressures.

In assembly, the first and second driven rollers 45, 46, the first and second variable resistors 49, 51, and the resiliently biasing roller 56 are mounted on the attachment plate 26, and then the attachment plate 26 is fixed to the inner surface of the lower case 9.

The ball 44 might be made of glass or synthetic resin rather than metal such as steel. However, these alternative materials have specific gravities smaller than metal and hence fail to provide a sufficient large frictional force when in contact with the base. The ball 44 would then tend to slip on the base and no proper signals would be generated. For this reason, metal is the best material for the ball 44. The ball 44 of metal should however be of a surface roughness to be maintained in a certain desired range.

According to a test, coefficients of friction changed with various surface roughnesses of the ball 44 as shown in FIG. 16. In the test, coefficients of friction were measured with respect to various bases on which the X-Y input device 4 is used, bases being made of general-purpose glass, frosted glass, melamine resin, polyurethane, and acrylic resin. The graph of FIG. 16 has a horizontal axis representing the surface roughness of the ball 44 and a vertical axis the coefficient of friction. The curve (a) indicates changes in the coefficient of friction with respect to a sheet of general-purpose glass having a flat surface. The curve (b) shows variations in the coefficient of friction against a sheet of frosted glass having minute projections and recesses on the surface. The curve (c) represents variations in the coefficient of friction against a decorative sheet of melamine resin attached to a desk. The curve (d) shows changes in the coefficient of friction against a sheet of polyurethane having a surface with small projections and recesses. The curve (e) indicates changes in the coefficient of friction against a sheet of acrylic resin.

The expression "surface roughness $5\mu$" referred to in this test means that the ball 44 has surface projections and recesses, and the lowest surface of a recess and the highest surface of a projection are spaced a distance of $5\mu$ from each other.

Study of FIG. 16 shows that if the surface roughness of the ball is $1.7\mu$ (at measuring points on the lefthand end of the graph) or $2.2\mu$ (at second measuring points from the lefthand end), then the cofficients of friction are generally small and the ball 44 tends to slip on the base during rolling movement thereon. To provide a desired torque due to friction between the ball 44 and the base, it is required that the ball 44 have a surface roughness of about $5\mu$ or higher. For a greater frictional torque, the surface roughness of the ball 44 should be increased. However, an increased surface roughness leads to the following problem:

The ball 44 of metal is finished by grinding a ball-shaped blank material through steps to provide progressively smaller surface roughnesses. The surface roughness of the ball 44 is therefore determined by the grinding steps which the ball 44 have gone through. A larger surface roughness of the ball 44 means that the ball 44 has not been finished enough and as a result has no desired sphericity. With no desired sphericity, the first and second driven rollers 45, 46 kept in contact with the ball 44 are liable to rotate under different conditions, and no proper input signals are produced.

If the surface roughness of the ball 44 were too large, then the ball would produce noise on rolling movement on the hard base, and hence would suffer a reduced commercial value. The surface roughness of the ball 44 were greater, then the ball 44 as it rolls would absorb any liquid such as water, coffee, or ink on the base, and such liquid would be trapped in the surface recesses of the ball 44, causing the latter to rust. If the ball surface had rust, then the ball 44 would be subjected to varying conditions in which it contacts the base and the driven rollers 45, 46, with the result that input signals would tend to be unstable. For the above reasons, the surface roughness of the ball 44 should be within about $20\mu$, and preferably in the range of from about 10 to $15\mu$.

It is preferable to treat the ball 44 with soft-nitriding (Tufftride) for thereby increasing the wear resistance, fatique resistance, and corrosion resistance of the ball 44. Even with this treatment, the surface roughness of the ball 44 should be kept in the range of from about 5 to $20\mu$.

Figure 17:
FIGS. 17 and 18 are enlarged fragmentary cross-sectional views of different sheets for use with the X-Y input device.
Figure 18:

The sheet 5 on which the X-Y input device 4 is moved should preferably be so soft that its surface will be slightly depressed in contact with the ball 44. Such sheet 5 assures an increased area of contact with the ball 44 and provides a relatively large frictional force since the ball 44 has a desired degree of surface roughness. The polyurethane sheet, indicated by the curve (d) in FIG. 16, has such softness that its surface will be slightly recessed in contact with the ball 44. As the polyurethane sheet also has surface projections and recesses, it is preferred for use as the sheet 5. FIGS. 17 and 18 shows different sheets in enlarged cross section. FIG. 17 illustrates the sheet 5 in the form of a single polyurethane sheet 57 having a surface with minute projections and recesses formed as a stain finish. FIG. 18 shows the sheet 5 comprising the polyurethane sheet 57 and an antiskid sheet 58 made of soft synthetic rubber applied to the underside of the polyurethane sheet 57. The antiskid sheet 58 prevents the sheet 5 from moving around on a table or desk during operation of the X-Y input device.

Figure 19:
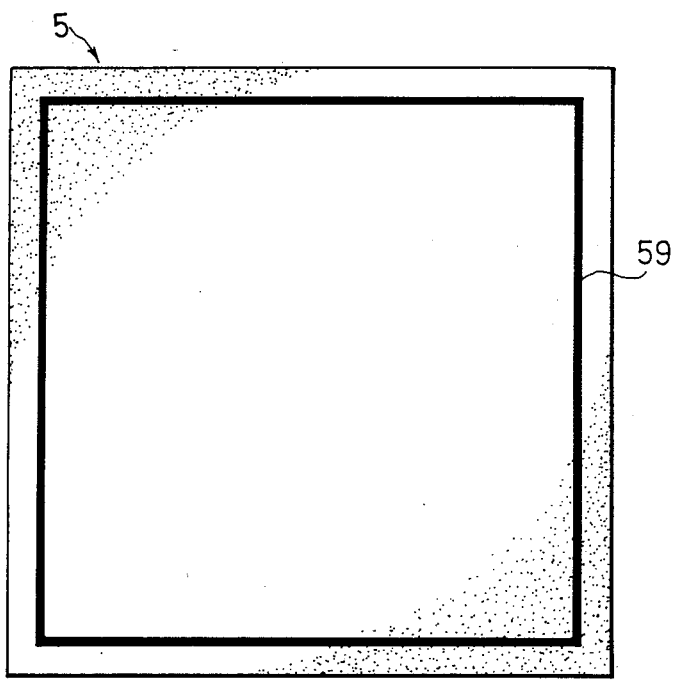
FIG. 19 is a plan view of a sheet for use with the X-Y input device.

As shown in FIG. 19, the sheet 5 may be marked with a printed boundary line 59 slightly inwardly of the outer peripheral ege of the sheet 5, the boundary line 59 serving to indicate an area in which to operate the X-Y input device 4. The operator can move the X-Y input device 4 within the area surrounded by the boundary line 59 without the danger of running off the sheet 5.

Figure 20:
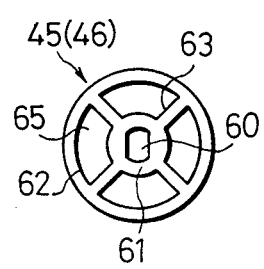
FIG. 20 is a side elevational view of the driven roller.
Figure 21:
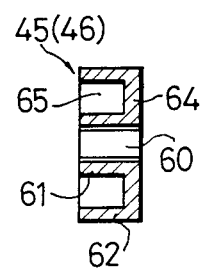
FIG. 21 is a cross-sectional view of the driven roller.

FIG. 20 is a side elevational view of the driven roller 45, 46, and FIG. 21 is a cross-sectional view thereof. Each of the first and second driven rollers 45, 46 is molded of synthetic resin with reinforcing fibers such as glass fibers mixed therein. The driven roller has a hub 61 having an elliptical through hole 60 for insertion therethrough of the rotatable shaft 48, 50, an outer cylinder 62 spaced radially outwardly from the hub 61, a plurality of connectors 63 extending radially from the hub 61 to the outer cylinder 62, and an end wall 64 joining and of the hub 61 and an end of the outer cylinder 62. The hub 61, the outer cylinder 62, the connectors 63, and the end wall 64 have substantially equal thicknesses. There are a plurality of sectorial recesses 65 defined between the hub 61 and the outer cylinder 62 and divided by the connectors 63.

The driven rollers 45, 46 of the foregoing construction are lightweight, free from internal distortion due to molding operation, and have a desired degree of sphericity. Therefore, rotation of the ball 44 can be properly transmitted to the driven rollers 45, 46.

Figure 22:
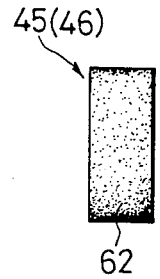
FIG. 22 is a front elevational view of a modified driven roller.

FIG. 22 shows a modififed driven roller 45, 46. The modified driven roller has a roughened outer peripheral surface formed with minute projections and recesses to prevent any slippage between the driven rollers 45, 46 and the ball 44.

Figure 23:
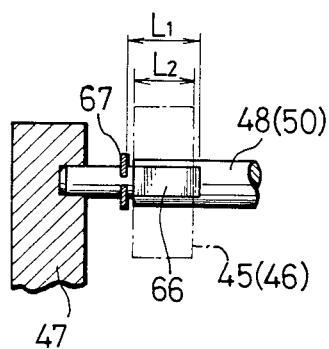
FIG. 23 is a fragmentary front elevational view of a rotatable shaft.

FIG. 23 is a fragmentary front elevational view of the rotatable shaft 48, 50 supporting the driven roller 45, 46. The rotatable shaft 48, 50 has a pair of diametrically opposite flat surfaces 66 which provide an elliptical cross section to the rotatable shaft 48, 50. The driven roller 45, 46 is fitted on the rotatable shaft 48, 50 at the elliptical cross section thereof as shwon by the dot-and-dash lines in FIG. 23. After the driven roller 45, 46 is mounted on the rotatable shaft 48, 50, a retaining washer 67 is attached to the latter. The retaining washer 67 is spaced from the remoter ends of the flat surfaces 66 by a distance $L_1$ which is slightly larger than the width $L_2$ of the driven roller 45, 46. Thus, the driven roller 45, 46 is axially freely movable for the interval equal to the difference between the distances $L_1$, $L_2$. This enables the driven rollers 45, 46 to follow the ball 44 which may be displaced horizontally off position while the X-Y input device 4 is in operation.

Figure 25:
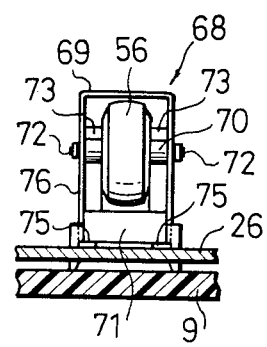
FIG. 25 is a rear elevational view of the resiliently biasing means.
Figure 24:
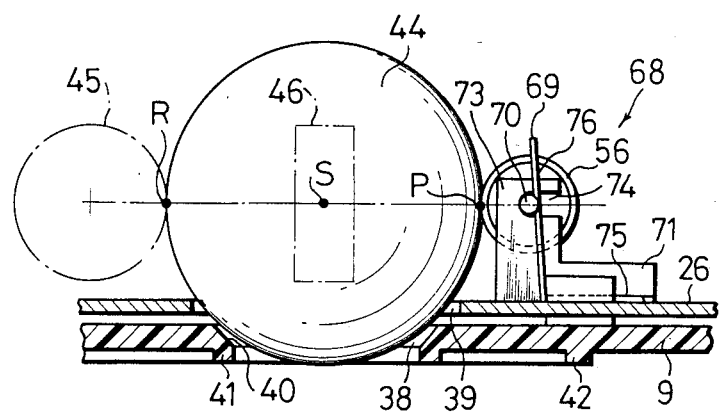
FIG. 24 is a side elevational view of a resiliently biasing means.
Figure 26:
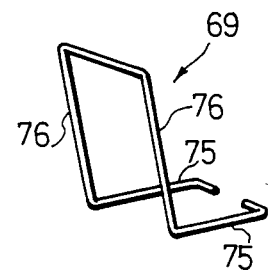
FIG. 26 is a perspective view of a wire spring used with the resiliently biasing means.

FIG. 24 is a side elevational view of a resiliently biasing means 68 including the resiliently biasing roller 56, FIG. 25 is a rear elevational view of the resiliently biasing means 68, and FIG. 26 is a perspective view of a wire spring 69 for use in the resiliently biasing means 68.

The resiliently biasing means 68 is composed of the resiliently biasing roller 56 made of synthetic resin or hard rubber, a shaft 70 rotatably supporting the roller 56, a support 71 slidably supporting ends of the shaft 70, and a wire spring 69 for resiliently urging the resiliently biasing roller 56 against the ball 44. As shown in FIG. 25, the ends of the shaft 70 have retainers 72 which prevent the wire spring 69 from moving axially off the shaft 70. The support 71 have upstanding projections 73, 73 spaced laterally from each other and supporting the ends of the shaft 70. The upstanding projections 73, 73 have recesses 74 opening away from the ball 44. The ends of the shaft 70 are slidably inserted in the recesses 74, and the resiliently biasing roller 56 supported by the shaft 70 is rotatably inserted between the projections 73, 73.

As shown in FIG. 26, the wire spring 69 comprises a pair of horizontal base ends 75, 75, and a pair of pressers 76, 76 extending obliquely upwardly from ends of the horizontal base ends 75, 75, respectively, and joined to each other. The base ends 75 and the pressers 76 can easily be made as an integral construction by bending a single spring wire material. As illustrated in FIGS. 24 and 25, the base ends 75 are inserted into both sides of the support 71 to position the wire spring 69, while the pressers 76 are resiliently held against the ends of the shaft 70. The wire spring 69 thus mounted urges the roller 56 resiliently against the ball 44, which in turn is resliently pressed equally against the first and second driven rollers 45, 46, thus providing equal pressures of contact between the ball 44 and the first and second driven rollers 45, 46.

The ball 44 is held in contact with the first driven roller 45 at a point R, with the second driven roller 46 at a point S, and with the resiliently biasing roller 56 at a point P. In order to enable the resiliently biasing means 68 to urge the ball 44 resiliently against the first and second driven rollers 45, 46, these points R, S, P of contact are positioned substantially in the same plane during use of the X-Y input device 4.

Since the ball 44 is rotatably disposed adjacent to the opening 38 in the lower case 9 as described above, the ball 44 tends to move up and down while the X-Y input device 4 is being operated. The ball 44 is thus apt to hit the peripheral edge around the opening 38 or the peripheral edge of the through hole 39 in the attachment plate 26, making noise or damaging the ball 44 itself.

Figure 27:
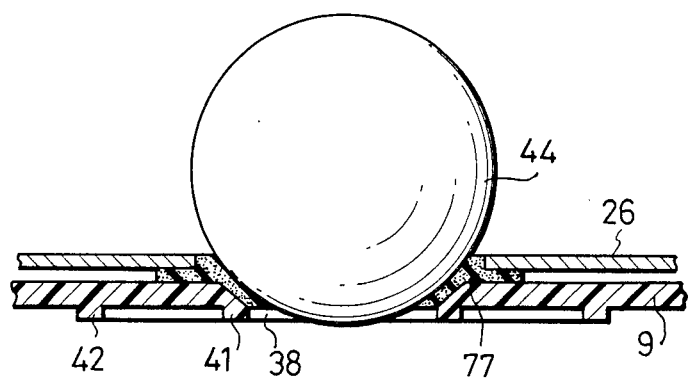
FIG. 27 is a fragmentary cross-sectional view of a ball protection member mounted in place.

To eliminate such a problem, a resilient ball protection member 77 (FIG. 27) is placed adjacent to the peripheral edge of the opening 38. The ball protection member 77 is made of synthetic rubber or soft synthetic resin and has an annular shaft surrounding the peripheral edge of the opening 38. The ball protection member 77 may be fixed in position by being sandwiched between the lower case 9 and the attachment plate 26, or bonded to either the lower case 9 or the attachment plate 26. The resilient ball protection member 77 disposed adjacent to the opening 38 serves to dampen the ball 77, thus solving the problem of noise or damage to the ball 77. The annular ball protection member 77 substantially fills the gap between the opening 38 and the ball 44, and prevents entry of dust or other foreign matter into the casing 8 to eliminate the troubles which would otherwise be caused by dust or other foreign matter.

Figure 28:
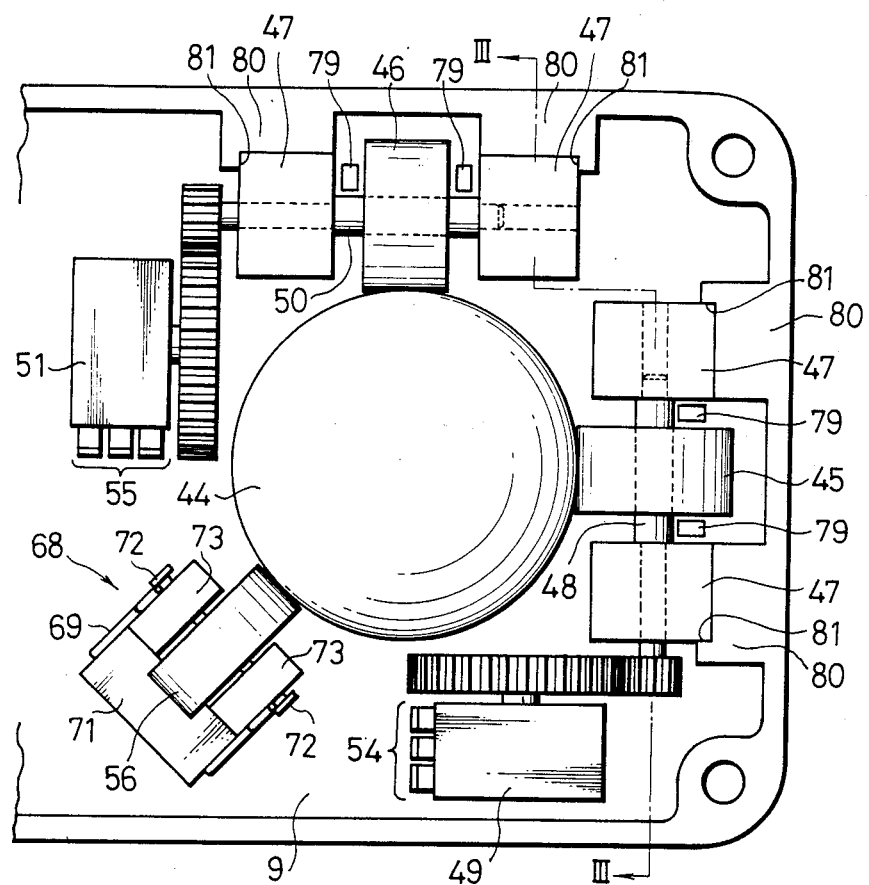
FIG. 28 is an enlarged plan view of an operating unit in an X-Y input device.
Figure 29:
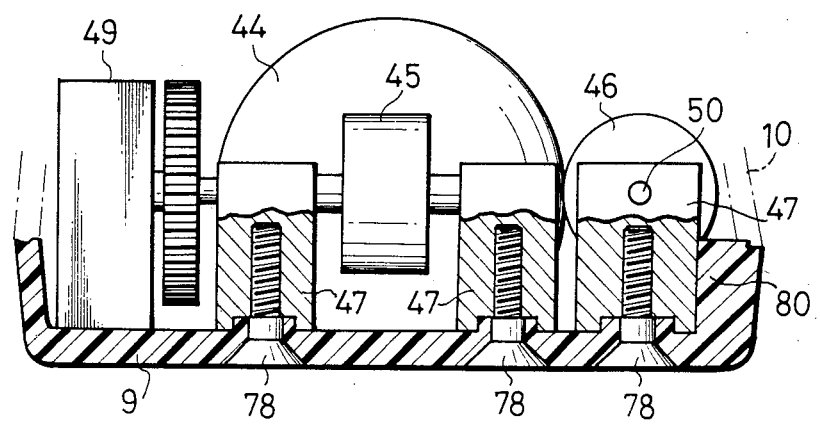
FIG. 29 is a side elevational view of the operating unit with parts shown in cross section taken along line III—III of FIG. 28.

FIG. 28 is an enlarged plan view of an operating unit having no attachment plate 26, and FIG. 29 is a side elevational view of the operating unit, with parts shown in cross section taken along line III—III of FIG. 28. The illustrated input device has no attachment plate 26 for purpose of reducing the number of parts used. The bearings 47 for the first and second driven rollers 45, 46, the first and second variable resistors 49, 51, and the support 71 for the resilient biasing means 48 are directly attached to the lower case 9 by screws or any other suitable means. The bearings 47 through which the shafts 48, 50 extend are not integrally formed with the lower case 9, but fastened to the lower case 9 by menas of screws 47 threaded into the lower surface of the lower case 9 as shown in FIG. 29.

When the X-Y input device happens to drop on a hard object with the ball 44 positioned above the first or second driven roller 45 or 46, the first or the second driven roller 45 or 46 is subjected to a large impact due to the weight of the ball 44. The impact force is then transmitted to the rotatable shaft 48 or 50 and to the bearings 47 therethrough, causing the shaft 48 or 50 to be deformed, wobbled, or disengaged from the lower case 9.

To prevent this, the lower case 9 has two integral projections 79 (FIG. 28) positioned in the vicinity of each of the shafts 48, 50 remotely from the ball 44 for preventing the shaft 48, 50 from being deformed. These shaft deformation prevention projections 49 are slightly spaced from the shafts 48, 50 so as not to interfere with normal rotation of the shafts 48, 50. As illustrated in FIGS. 28 and 29, the lower case 9 has integral bearing supports 80 projecting remotely from the ball 44 and having steps 81 (FIG. 28) against which the bearings 47 are held at their corners for thereby positioning the bearings 47 on the lower case 9.

Figure 30:
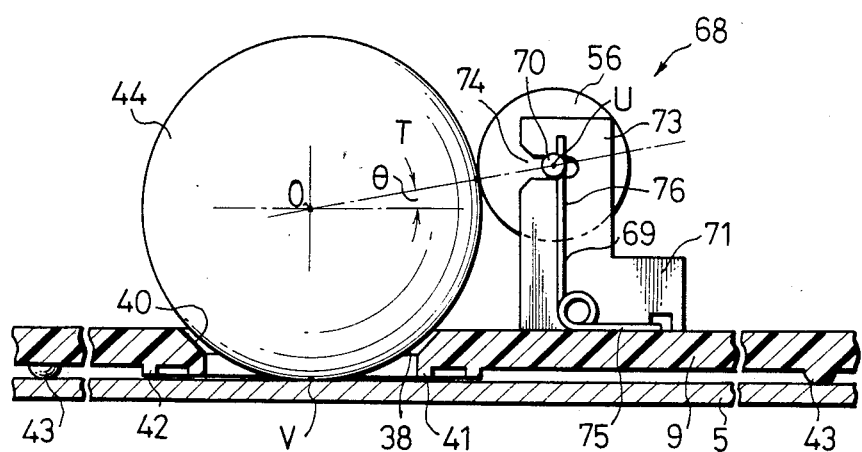
FIG. 30 is a side elevational view of a resiliently biasing means.

With the X-Y input device 4 shown in FIG. 30, the resiliently biasing roller 56 has an axis U of rotation positioned slighly above the center O of rotation of the ball 44. Thus, the resiliently biasing roller 56 is kept in contact with the ball 44 at a point T located upwardly of the center O of the ball 44. With this arrangement, the lower case 9 is supported by an upper semispherical portion of the ball 44 through the support 71, the shaft 70, and the resiliently biasing roller 56 of the resiliently biasing means 68. Consequently, the total weight of the parts of the X-Y input device 4 excluding the ball 44 and the force applied by the hand of the operator are almost fully concentrated on a point V of contact between the ball 44 and the base (such as the sheet 5). This reduces the pressure of contact of the balancer projections 43 on the lower case 9 with the base, making it possible to operate the input device 4 smoothly and lightly on the base. With the load concentrated on the point V, the ball 44 is substantially free from slippage on the base.

The angle $\theta$ shown in FIG. 30 is in the range of from about 10 to 30 degrees, and preferably in the range of from 20 to 30 degrees.

The force with which the ball 44 is urged by the resiliently biasing means 68 against the first and second driven rollers 45, 46 has a great effect on the transmission of rotation from the ball 44 to the driven rollers, and is quite important in producing stable input signals. The resilient biasing means 68 of the foregoing construction sometimes fails to provide a desired contact force due to variations in the spring resiliency of the wire spring 69, variations in the diameters of the ball 44 and the resiliently biasing roller 56, and changes in the position of attachment of the support 71.

Figure 31:
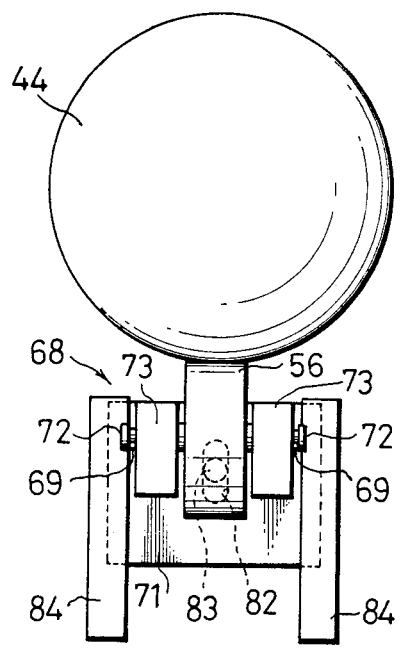
FIG. 31 is a plan view of the resiliently biasing means.
Figure 32:
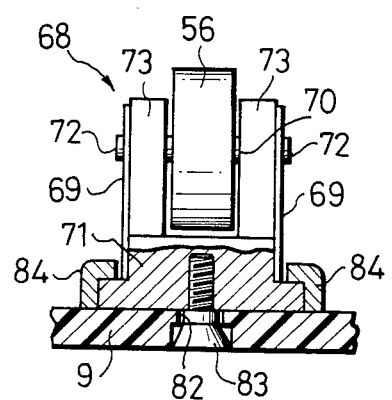
FIG. 32 is a rear elevational view, partly shown in cross section, of the resiliently biasing means.

This problem can be solved by an arrangement as shown in FIGS. 31 and 32. The lower case 9 or the attachment plate 26 has an oblong hole 82 oriented toward the ball 44, and the resiliently biasing means 68 has a support block positionally adjustable by means of an adjustment screw 83 extending through the oblong hole 82. Guide members 84 are held in engagement with the support 71 for guiding the resiliently biasing means 68 in its sliding movement.

Figure 33:
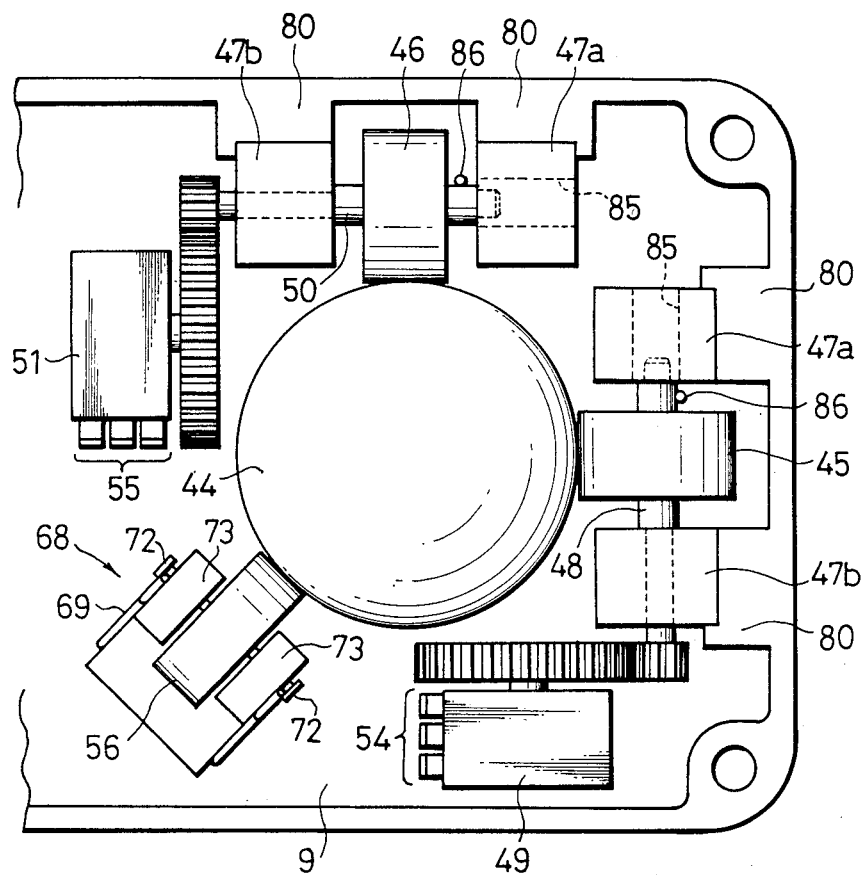
FIG. 33 is an enlarged plan view of an operating unit in an X-Y input device.
Figure 34:
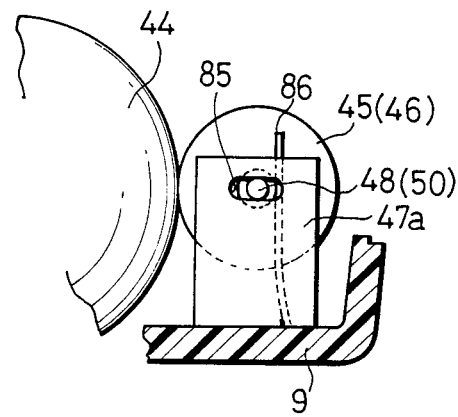
FIG. 34 is a fragmentary side elevational view of a bearing in the operating unit.

The force with which the ball 44 is held against the first and second driven rollerse 45, 46 can be automatically adjusted in a desired range by a means shown in FIGS. 33 and 34.

The rotatable shafts 48, 50 which support the first and second driven rollers 45, 46 have distal ends slidably supported in horizontally elongate holes 85 (FIG. 34) defined in bearings 47a. The rotatable shafts 48, 50 are thus horizontally angularly movable about bearings 47b by which proximal ends of the shafts 48, 50 are supported. Resilient bearing pins 86 project upwardly from the lower case 9 in the vicinity of the distal ends of the rotatable shafts 48, 50 remotely from the ball 44, the resilient bearing pins 86 being held in contact with peripheral surfaces of the rotatable shafts 48, 50. If the resilient biasing means 68 urges the ball 44 too strongly, then the bearing pins 86 are caused to yield under the force from the ball 44. Conversely, if the ball 44 is pushed too weakly by the resilient biasing means 68, then the driven rollers 45, 46 are biased by the resilient bearing pins 86 into pressed contact with the ball 44. Accordingly, the ball 44 and the first and second driven rollers 45, 46 are brought into contact with each other under an automatically adjusted force. This automatic force adjusting means and the positional adjustment of the resilient biasing means 68 as shown in FIGS. 31 and 32 may be combined for a more effective arrangement.

Figure 35:
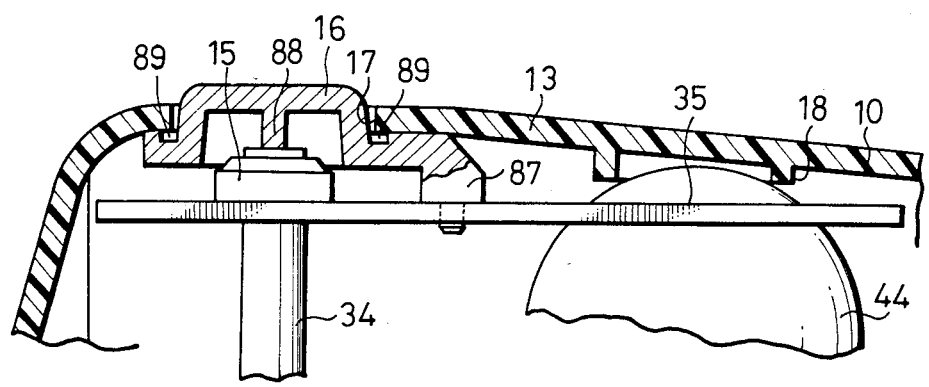
FIG. 35 is an enlarged fragmentary cross-sectional veiw of a modified switch actuator.

FIG. 35 illustrates a modified switch actuator 16 for the switch 15. The switch actuator 16 made of synthetic resin has one end 87 supported by a support member such as the printed-circuit board 35. The switch actuator 16 is thus angularly movable about the end 87. The switch actuator 16 has an integral switch depressor 88 positioned in confronting relation to the switch 15. The switch actuator 16 also has an annular groove 88 defined in its upper surface and confronting the peripheral edge of the hole 17 in the upper case 10. The annular groove 88 serves to trap any water entering through the hole 17 at the time when the X-Y input device 4 is accidentally covered with water, thereby protecting the interior of the input device 4 from entry of water.

While in the foregoing embodiments the angles of rotation of the driven rollers are detected by the variable resistors, such angles may be detected by encoders.

Although certain preferred embodiments have been shown and described, it should be understood that many changes and modifications may be made therein without departing from the scope of the appended claims.

What is claimed is:

1. An X-Y input device comprising a rotatable ball, a first driven roller held in contact with said rotatable ball and rotatable in response to rotation of said rotatable ball, a second driven roller held in contact with said rotatable ball and rotatable in response to rotation of said rotatable ball, said second driven roller having an axis of rotation extending substantially perpendicularly to that of said first driven roller, first angle detector means for detecting an angle of rotation of said first driven roller, second angle detector means for detecting an angle of rotation of said second driven roller, and a casing housing said rotatable ball, said first and second driven rollers, and said first and second angle detector means, said casing having a lower opening with said rotatable ball partly projecting downwardly therethrough for rolling movement on a base, said casing having at least one rejector projection having a free outer end on a lower surface thereof for rejecting foreign matter on said base to prevent said foreign matter from reaching said ball, said projection being integral with the casing at said lower surface and being an annular shape surrounding said opening in said casing, wherein the said free outer end of said projection and the contact point of said ball with said base are essentially in the same plane when the case is moved.

2. An X-Y input device according to claim 1, wherein said rejector projection comprises a plurality of annular ridges surrounding said opening in said casing.

3. An X-Y input device according to claim 1, wherein said lower surface of said casing has two balancer projections spaced from each other and having lower ends located slightly downwardly of a lower end of said rejector projection, whereby said casing can be supported by said at least one rejector portion and said two balancer projections.

4. An X-Y input device according to claim 3, wherein said lower ends of said balancer projections are round.

5. An X-Y input device according to claim 1, wherein said lower surface of said casing has at least three balancer projections positioned radially outwardly of said rejector projection and having lower ends located slightly downwardly of a lower end of said rejector projection.

* * * * *